(12) United States Patent
Abro et al.

(10) Patent No.: US 12,344,150 B2
(45) Date of Patent: Jul. 1, 2025

(54) FLOOR MATS FOR VEHICLES AND VEHICLES INCLUDING FLOOR MATS

(71) Applicant: Toyota Motor Engineering & Manufacturing North America, Inc., Plano, TX (US)

(72) Inventors: Lauren M. Abro, West Bloomfield, MI (US); Yuko N. Gidcumb, West Bloomfield, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 380 days.

(21) Appl. No.: 18/098,346

(22) Filed: Jan. 18, 2023

(65) Prior Publication Data
US 2024/0239256 A1    Jul. 18, 2024

(51) Int. Cl.
    *B60N 3/04*        (2006.01)
(52) U.S. Cl.
    CPC .................... *B60N 3/048* (2013.01)
(58) Field of Classification Search
    CPC .......... B60N 2/56; B60N 2/5678; B60N 3/04; B60N 3/044; B60N 3/048
    USPC ..................................................... 296/97.23
    See application file for complete search history.

(56) References Cited

U.S. PATENT DOCUMENTS

| | | | | |
|---|---|---|---|---|
| 3,605,166 A | * | 9/1971 | Chen ....................... | A47L 23/24 428/116 |
| 4,876,135 A | * | 10/1989 | McIntosh .............. | A47L 23/266 428/128 |
| 5,254,384 A | | 10/1993 | Gordon | |
| 5,358,768 A | * | 10/1994 | Wiley, III ............. | B60N 3/044 428/95 |
| 6,677,027 B1 | * | 1/2004 | Lu .......................... | B60N 3/044 296/97.23 |
| 11,857,004 B2 | * | 1/2024 | Cauchy .................. | H10N 10/13 |
| 2013/0260083 A1 | * | 10/2013 | Price ....................... | B29C 45/26 428/95 |
| 2015/0091324 A1 | * | 4/2015 | Hay ....................... | B60N 3/048 296/97.23 |

FOREIGN PATENT DOCUMENTS

| | | |
|---|---|---|
| CN | 208515438 U | 2/2019 |
| CN | 208828013 U | 5/2019 |
| DE | 1778919 U | 12/1958 |
| DE | 102019201641 A1 * | 8/2020 |

(Continued)

OTHER PUBLICATIONS

Ruminski, "The Heated Car Mat From Martinson-Nicholls Warms Feet and Dries Vehicle Floor" (https://www.prweb.com/releases/2005/09/prweb289440.htm), Sep. 26, 2005.

*Primary Examiner* — Jason S Daniels
(74) *Attorney, Agent, or Firm* — Dinsmore & Shohl LLP

(57) ABSTRACT

A floor mat includes a mat body comprising a channel that is located below an exterior surface of the mat body. The channel is configured to provide a passageway for liquid that is absorbed through the exterior surface. A plurality of granules is located in a chamber below the exterior surface of the mat body. The plurality of granules are free to move relative to each other within the chamber due to pressure applied to the exterior surface.

20 Claims, 3 Drawing Sheets

(56) References Cited

FOREIGN PATENT DOCUMENTS

| GB | 2507717 A | 5/2014 |
| IN | 202111046453 A | 7/2022 |
| JP | 2011160907 A | 8/2011 |
| KR | 20140089958 A | 7/2014 |

* cited by examiner

FLOOR MATS FOR VEHICLES AND VEHICLES INCLUDING FLOOR MATS

TECHNICAL FIELD

The present specification generally relates to floor mats for vehicles and, more specifically, to floor mats for vehicles that are configured to remove liquids.

BACKGROUND

Floor mats for vehicles are often used to protect underlying floor carpet from dirt, debris and liquids. The floor mats may be made with a plastic material and may include channels on their exterior surface to reduce sloshing of liquid over the floor mats. However, the liquid may tend to pool on the outer facing surface of the floor mats.

Accordingly, a need exists for alternative floor mats that are configured to remove liquids from the floor mats.

SUMMARY

In one embodiment, a floor mat includes a mat body comprising a channel that is located below an exterior surface of the mat body. The channel is configured to provide a passageway for liquid that is absorbed through the exterior surface. A plurality of granules is located in a chamber below the exterior surface of the mat body. The plurality of granules are free to move relative to each other within the chamber due to pressure applied to the exterior surface.

In another embodiment, a vehicle includes a cabin and a passenger seat located in the cabin. A floor mat is located on a floor of the cabin adjacent the passenger seat. The floor mat includes a mat body that includes a channel that is located below an exterior surface of the mat body. The channel is configured to provide a passageway for liquid that is absorbed through the exterior surface. A plurality of granules is located in a chamber below the exterior surface of the mat body. The plurality of granules are free to move relative to each other within the chamber due to pressure applied to the exterior surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicles, such as cars and pickup trucks, that include floor mats that are configured to wick away liquid from feet of a passenger and then to remove the liquid from its exterior surface. The floor mats include a mat body that includes a channel formed therethrough. The channel is located below the exterior surface of the mat body. The channel provides a passageway for liquid that is absorbed through the exterior surface. A plurality of granules is located in a chamber below the exterior surface of the mat body. The granules are free to move relative to each other within the chamber due to pressure applied to the exterior surface. The plurality of granules may be configured to rub together and may generate heat through friction. In some embodiments, the plurality of granules may be formed of an electrically conductive material such that they may be heated through an inductive heating process.

Figure 1:
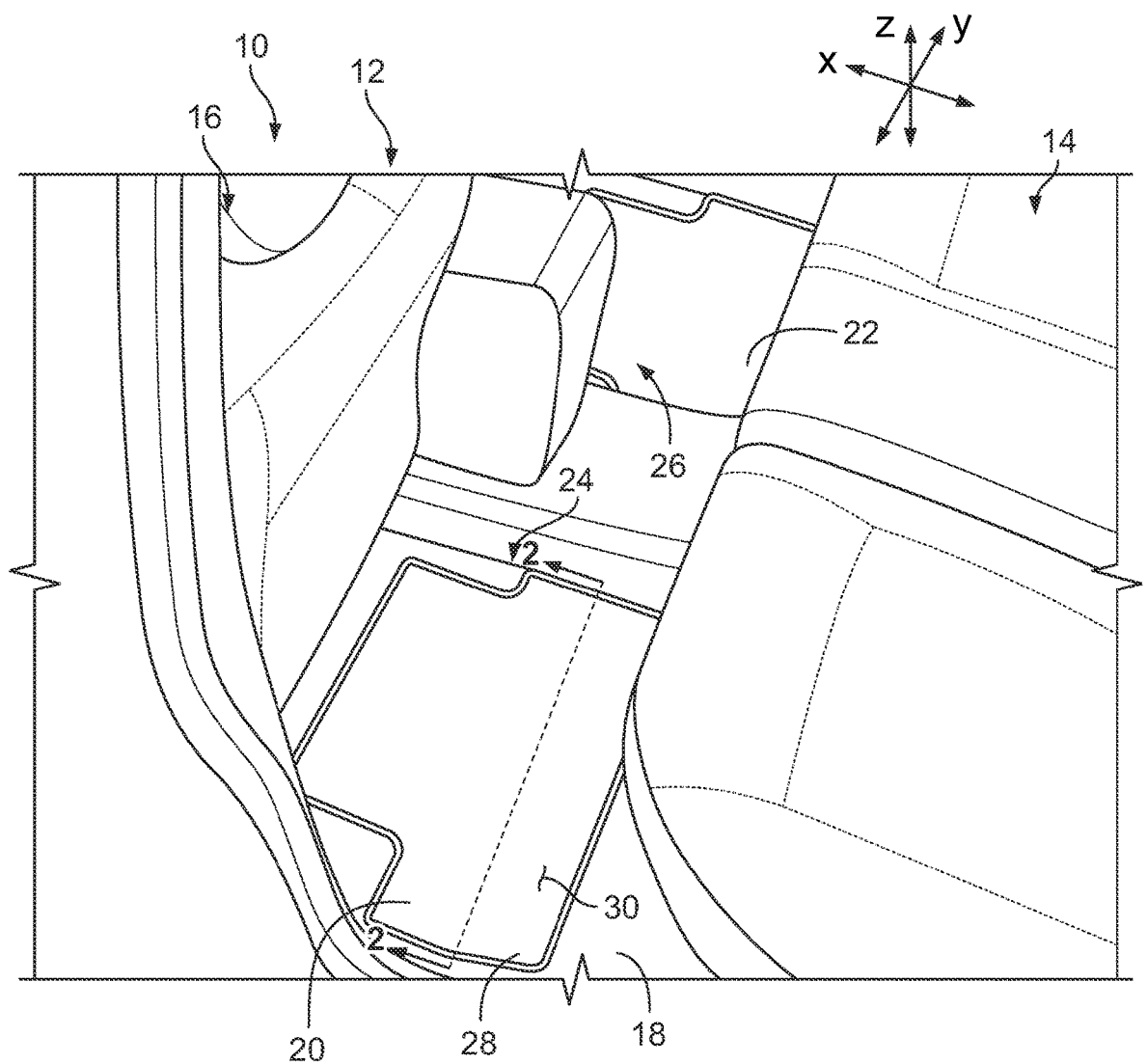
FIG. 1 is a perspective view of a portion of an interior of a vehicle including a floor mat, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1).

Referring to FIG. 1, a rear portion 12 of a cabin of a vehicle 10 is illustrated that includes a rear seat 14 located rearward of front seats 16 in the longitudinal direction. A vehicle floor 18 extends in both the longitudinal and lateral directions underneath the rear seat 14 and the front seats 16. In some embodiments, a carpet may be used to cover the vehicle floor 18.

Floor mats 20 and 22 are located on the vehicle floor 18 between the front seats 16 and the rear seat 14. The floor mats 20 and 22 may be located in footwells 24 and 26, which are recessed compartments in front of the rear seat 14 where a passenger's feet can be placed when inside the cabin. Each floor mat 20, 22 includes a mat body 28 having an exterior surface 30 on which feet of the passenger may rest.

Figure 2:
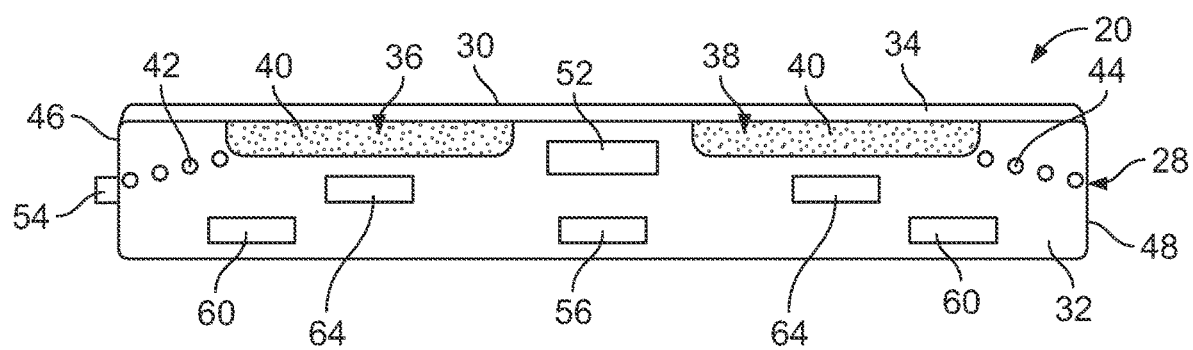
FIG. 2 is a diagrammatic section view of the floor mat along line 2-2 of FIG. 1, according to one or more embodiments shown and described herein.
Figure 3:
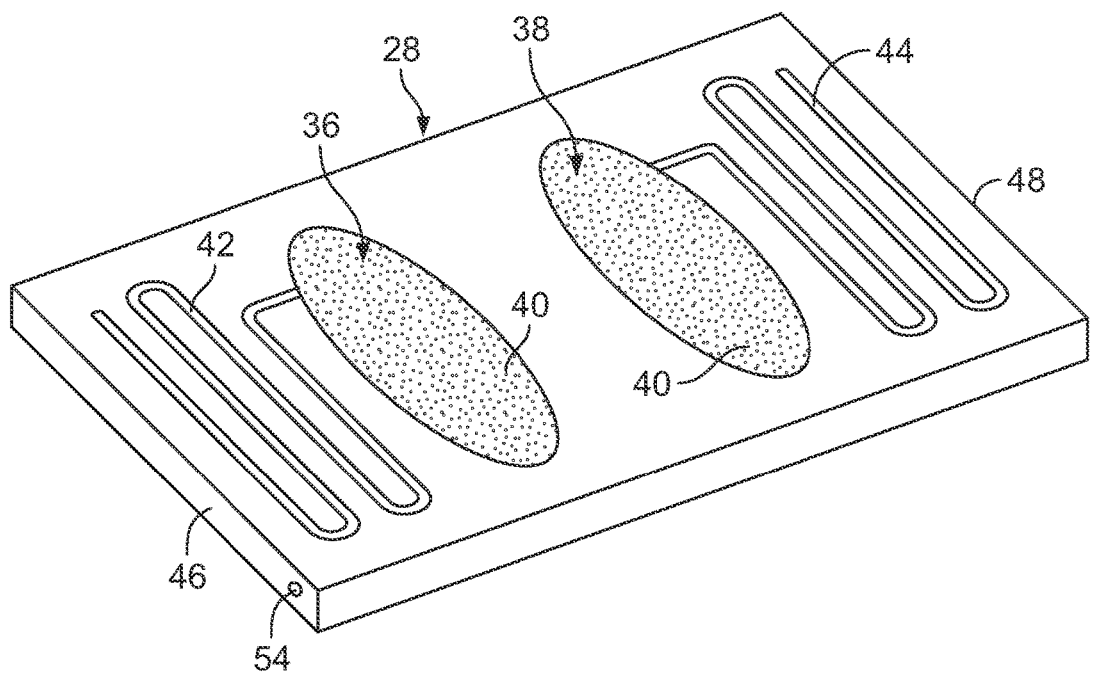
FIG. 3 is a diagrammatic top view of the floor mat of FIG. 2 with a top layer removed, according to one or more embodiments shown and described herein.

Referring to FIG. 2, a diagrammatic section view of the floor mat 20 is illustrated that includes the mat body 28 that may include multiple layers, such as a base layer 32 that is configured to rest against the vehicle floor 18 and a cover layer 34 that includes the exterior surface 30. Referring also to FIG. 3, the mat body 28 is illustrated without the cover layer 34. The cover layer 34 may be formed of any suitable material that allows liquid to pass therethrough toward the base layer 32. The base layer 32 may be formed of any suitable material, such as a plastic and/or rubber.

The mat body 28 includes chambers 36 and 38 that may be associated with foot rest locations that are located beneath the cover layer 34. A plurality of granules 40, such as a powder, may be located in the chambers 36 and 38. The granules 40 may be formed from an electrically conductive material such as a metal like, for example, iron. In some embodiments, the electrically conductive material may be magnetic. The granules 40 may be any suitable size and may be nanoparticle sized. Nanoparticles, as used herein, are granules having a diameter of less than 300 nm.

Channels 42 and 44 may extend from the chambers 36 and 38 toward opposite ends 46 and 48 of the mat body 28. In some embodiments, the channels 42 and 44 intersect the chambers 36 and 38 and are shaped and arranged to carry liquid (e.g., water) from the chambers 36 and 38. In some embodiments, the channels 42 and 44 may decline in elevation from the chambers 36 and 38 to encourage gravity flow of the liquid out of the chambers 36 and 38 and along the channels 42 and 44 toward the ends 46 and 48. The channels 42 and 44 may include curves or undulations to increase their length and the travel distance for any liquids travelling therealong.

The floor mat 10 may include one or more devices that are configured to remove the liquid that passes through the exterior surface 30. For example, referring also to FIG. 4, the floor mat 10 may include a heating unit 50. The electric heating unit 50 may include one or more heating elements 52, such as an electric resistive heating element 52 (FIG. 4) that can be activated using a user input 54, such as a switch, button, etc. A power supply 56 may be electrically connected to the electric heating unit 50 for supplying power thereto. For example, the power supply 56 may use batteries for supplying electrical power and may utilize rechargeable batteries.

The floor mat 20 may further include a blower unit 58 connected to the power supply 56 that may include one or more fans 60. The fans 60 may be located adjacent the channels 42 and 44 to blow air across the channels 42 and 44 and help to evaporate the liquid. The floor mat 20 may further include an induction heating unit 62 connected to the power supply 56 that includes one or more induction coils 64 that can be used to generate a magnetic field that is sufficient to heat the granules 40. While the induction coils 64 are illustrated outside the chambers 36 and 38 in FIG. 2, they may be located inside the chambers 36 and 38, as illustrated by FIG. 4.

Figure 4:
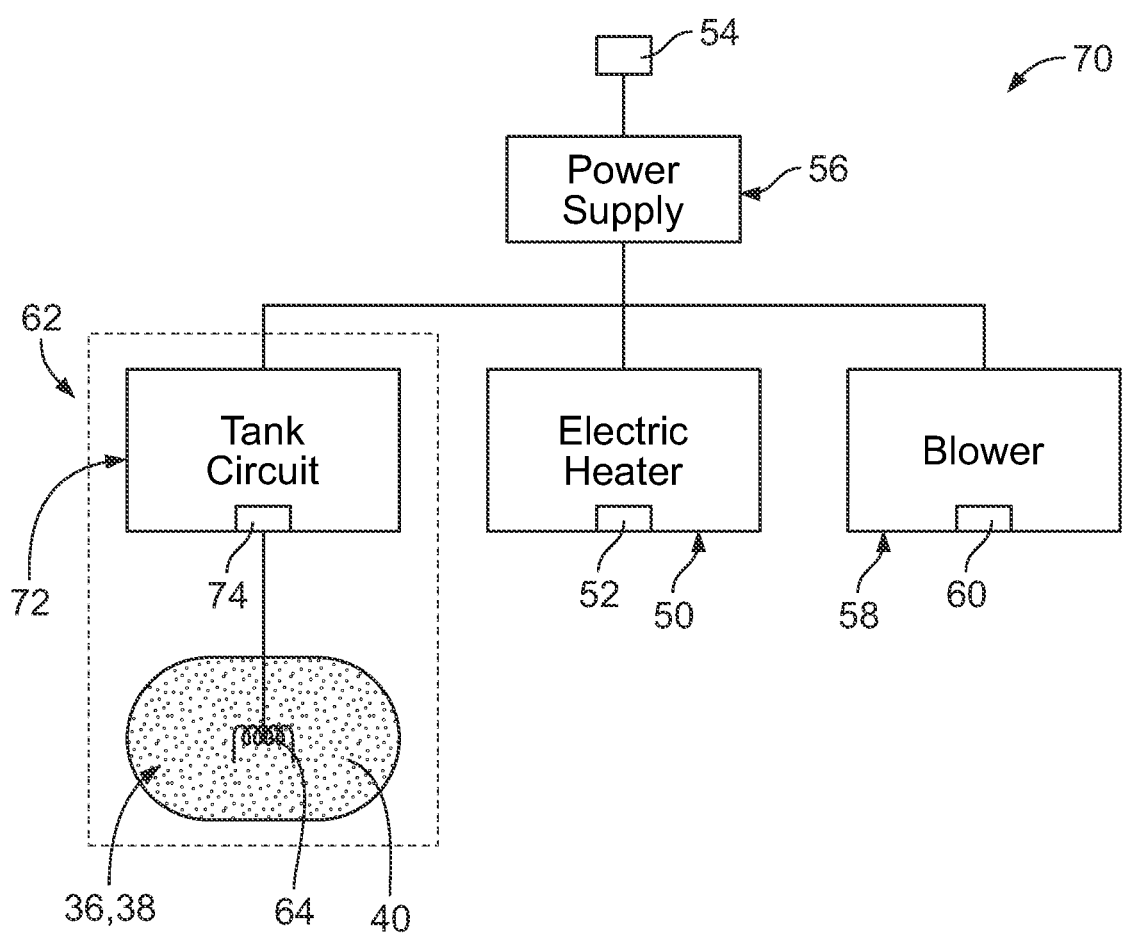
FIG. 4 is a diagrammatic view of a heating a ventilation system for the floor mat of FIGS. 1-3, according to one or more embodiments shown and described herein.

FIG. 4 diagrammatically illustrates an exemplary heating and ventilation system 70 for the floor mat 20. The power supply 56 may be electrically connected to one or more of the electric heating unit 50, the blower unit 58 and the induction heating unit 62. The user input 54 may be used to select which of the units 50, 58 and/or 62 is to be activated. The electric heating unit 62 may include the heating element 52, which may be a resistive heating element. The blower unit 58 may include the fan 60, which is used to provide pressurized air to the channels 42, 44 and/or the exterior surface 30 (FIG. 2) for facilitating evaporation. The induction heating unit 62 may include the induction coil 64 for generating a magnetic field. The induction coil 64 may be electrically connected to a tank or LC circuit 72 comprising an inverter 74 that can be used to convert DC power to AC power. The tank circuit 72 can also provide a high-frequency signal, such as operating between 10 and 400 kHz. The coil 54 may be placed in the chamber 36, 38 for heating the granules 40 through induction heating.

In some embodiments, the material and size of the granules 40 may be selected such that rubbing the granules 40 together generates heat. Without wishing to be bound by theory, when particles come into contact, friction energy is generated. The friction energy may be converted to frictional heat, which can cause a rise in temperature in the material. In some embodiments, placement of the chambers 36 and 38 may be selected to coincide with typical foot placement on the exterior surface 30 of the floor mat 20. In this regard, movement of the feet can cause movement of the granules 40 relative to each other, which can generate frictional heat.

The above-described floor mats include one or more heating elements that can be used to heat and evaporate liquids that come into contact with the floor mats. Further, the heating elements can be used to generate heat in order to melt and remove snow and ice and carry the liquid away from the feet using channels rather than the liquid pooling and remaining in place.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A floor mat comprising:
   a mat body comprising a channel that is located below an exterior surface of the mat body, the channel configured to provide a passageway for liquid that is absorbed through the exterior surface; and
   a plurality of granules located in a chamber below the exterior surface of the mat body, the plurality of granules being free to move relative to each other within the chamber due to pressure applied to the exterior surface.

2. The floor mat of claim 1 further comprising an electric heating element located in the mat body.

3. The floor mat of claim 1 further comprising a blower unit comprising a fan located in the mat body.

4. The floor mat of claim 1, wherein the chamber is located adjacent the channel.

5. The floor mat of claim 1 further comprising an induction coil located in the mat body that is configured to provide a magnetic field to the plurality of granules.

6. The floor mat of claim 5, wherein the induction coil is part of an induction heating circuit that is located in the mat body.

7. The floor mat of claim 6, wherein the induction heating circuit comprises an inverter that is configured to convert direct current to an alternating current.

8. The floor mat of claim 7, wherein the induction heating circuit comprises a power supply comprising a battery.

9. The floor mat of claim 1, wherein the channel extends from the chamber toward an end of the mat body.

10. The floor mat of claim 9, wherein the channel comprises one or more curves.

11. The floor mat of claim 1, wherein the plurality of granules comprises nanoparticles.

12. The floor mat of claim 11, wherein the nanoparticles comprise a ferromagnetic material.

13. A vehicle comprising:
   a cabin;
   a passenger seat located in the cabin;
   a floor mat located on a floor of the cabin adjacent the passenger seat, the floor mat comprising:
      a mat body comprising a channel that is located below an exterior surface of the mat body, the channel configured to provide a passageway for liquid that is absorbed through the exterior surface; and a plurality of granules located in a chamber below the exterior surface of the mat body, the plurality of granules being free to move relative to each other within the chamber due to pressure applied to the exterior surface.

14. The vehicle of claim 13, wherein the floor mat further comprises an electric heating element located in the mat body.

15. The vehicle of claim 13, wherein the floor mat further comprises a blower unit comprising a fan located in the mat body.

16. The vehicle of claim 13, wherein the chamber is located adjacent the channel.

17. The vehicle of claim 13, wherein the floor mat further comprises an induction coil located in the mat body that is configured to provide a magnetic field to the plurality of granules.

18. The vehicle of claim 17, wherein the induction coil is part of an induction heating circuit that is located in the mat body.

19. The vehicle of claim 18, wherein the induction heating circuit comprises an inverter that is configured to convert direct current to an alternating current.

20. The vehicle of claim 19, wherein the induction heating circuit comprises a power supply comprising a battery.

\* \* \* \* \*